United States Patent
Nishiwaki et al.

(10) Patent No.: US 6,265,991 B1
(45) Date of Patent: Jul. 24, 2001

(54) VEHICULAR FRONT MONITORING APPARATUS

(75) Inventors: Takeshi Nishiwaki, Tokyo; Shigekazu Okamura; Minoru Nishida, both of Hyogo, all of (JP)

(73) Assignees: Mitsubshi Denki Kabushiki Kaisha, Tokyo; Automotive Safety and Anti-Polution Technology Research Alliance, Hyogo, both of (JP)

( * ) Notice: Subject to any disclaimer, the term of this patent is extended or adjusted under 35 U.S.C. 154(b) by 0 days.

(21) Appl. No.: 09/566,082

(22) Filed: May 9, 2000

(30) Foreign Application Priority Data

Dec. 10, 1999 (JP) .................................................. 11-351088

(51) Int. Cl.$^7$ ...................................................... G08G 1/16
(52) U.S. Cl. ........................... 340/903; 340/904; 340/435
(58) Field of Search ..................................... 340/435, 436, 340/901, 903, 904, 905; 342/70, 72; 701/42, 48, 28; 180/167; 382/104, 281, 291

(56) References Cited

U.S. PATENT DOCUMENTS

| | | | |
|---|---|---|---|
| 5,508,929 | * 4/1996 | Harada | 701/48 |
| 5,617,085 | 4/1997 | Tsutsumi et al. | 340/903 |
| 5,734,344 | * 3/1998 | Yamada | 342/72 |
| 5,754,099 | * 5/1998 | Nishimura et al. | 340/435 |
| 5,818,355 | * 10/1998 | Shirai et al. | 340/903 |

FOREIGN PATENT DOCUMENTS

| | | | |
|---|---|---|---|
| 6-68398 | 3/1994 | (JP) | G08G/1/16 |
| 8-249598 | 9/1996 | (JP) | G08G/1/16 |

* cited by examiner

Primary Examiner—Van T. Trieu
(74) Attorney, Agent, or Firm—Sughrue, Mion, Zinn, Macpeak & Seas, PLLC

(57) ABSTRACT

A vehicular front monitoring apparatus which can reliably recognize a road configuration ahead of an own-vehicle through simpler computation. The apparatus comprises a distance measuring unit for radiating electromagnetic waves or the likes in plural directions, and detecting distances from an own-vehicle to a plurality of objects around the own-vehicle and lateral positions of the objects relative to a running direction of the own-vehicle, thereby measuring object positional data on coordinates defined by the running direction and a transverse direction of the own-vehicle; a road curvature estimating unit for estimating a curvature of a road ahead of the own-vehicle through Hough transform of the object positional data measured by the distance measuring unit; and a vehicle's own lane determining unit for determining whether other vehicles running ahead are in the same lane as the own-vehicle or not based on the curvature of the road estimated by the road curvature estimating unit.

22 Claims, 16 Drawing Sheets

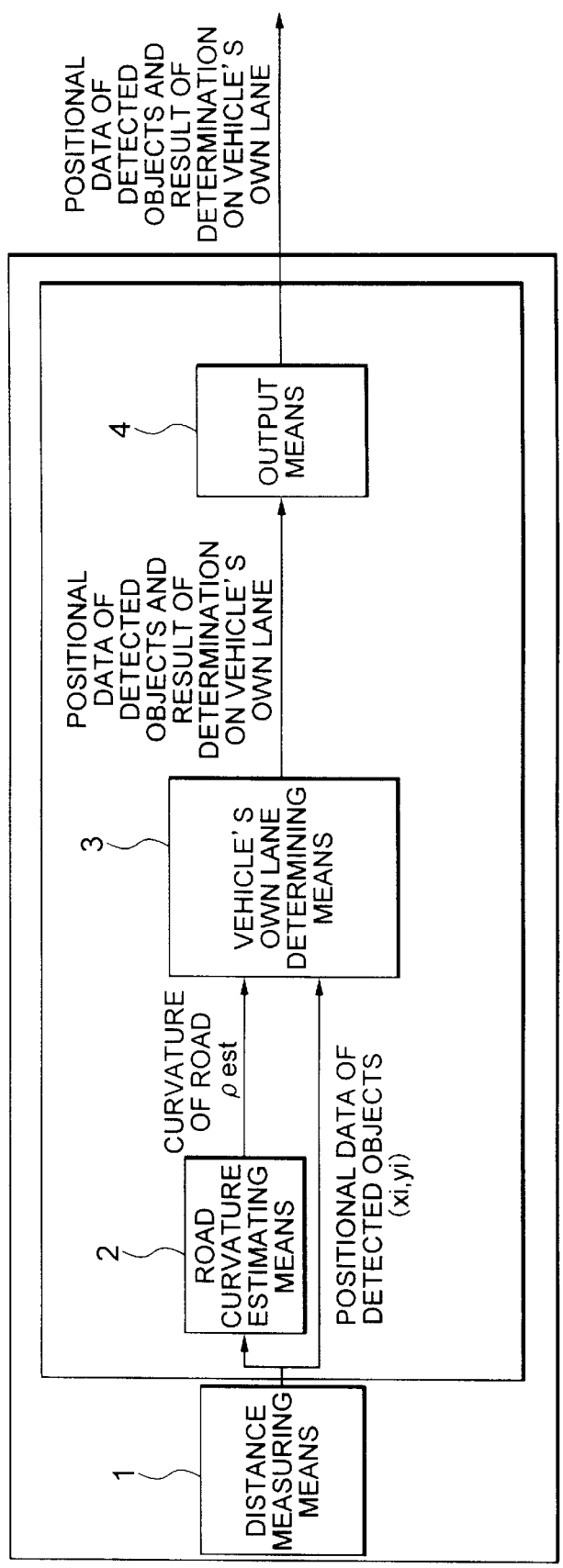

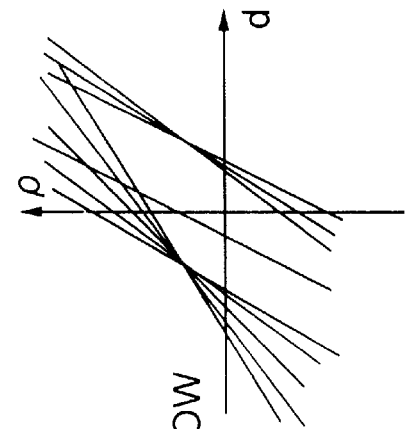
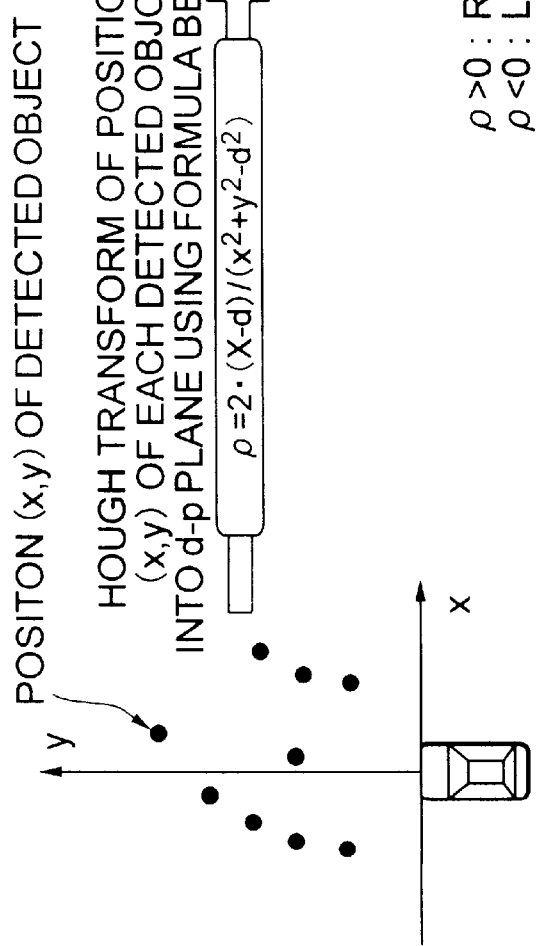
FIG. 3A
FIG. 3B
POSITION (x,y) OF DETECTED OBJECT
HOUGH TRANSFORM OF POSITION (x,y) OF EACH DETECTED OBJCT INTO d-ρ PLANE USING FORMULA BELOW
$$\rho = 2 \cdot (X-d)/(x^2+y^2-d^2)$$
$\rho > 0$ : RIGHTWARD CURVE
$\rho < 0$ : LEFTWARD CURVE
$d > 0$ : ON RIGHT SIDE FROM LANE CENTER
$d < 0$ : ON LEFT SIDE FROM LANE CENTER ◉ POSITIONAL DATA OF DETECTED OBJECTS STORED IN MOVING-OBJECT INFORMATION STORING MEANS

● POSITIONAL DATA OF DETECTED OBJECTS DETERMINED TO BE STATIONARY

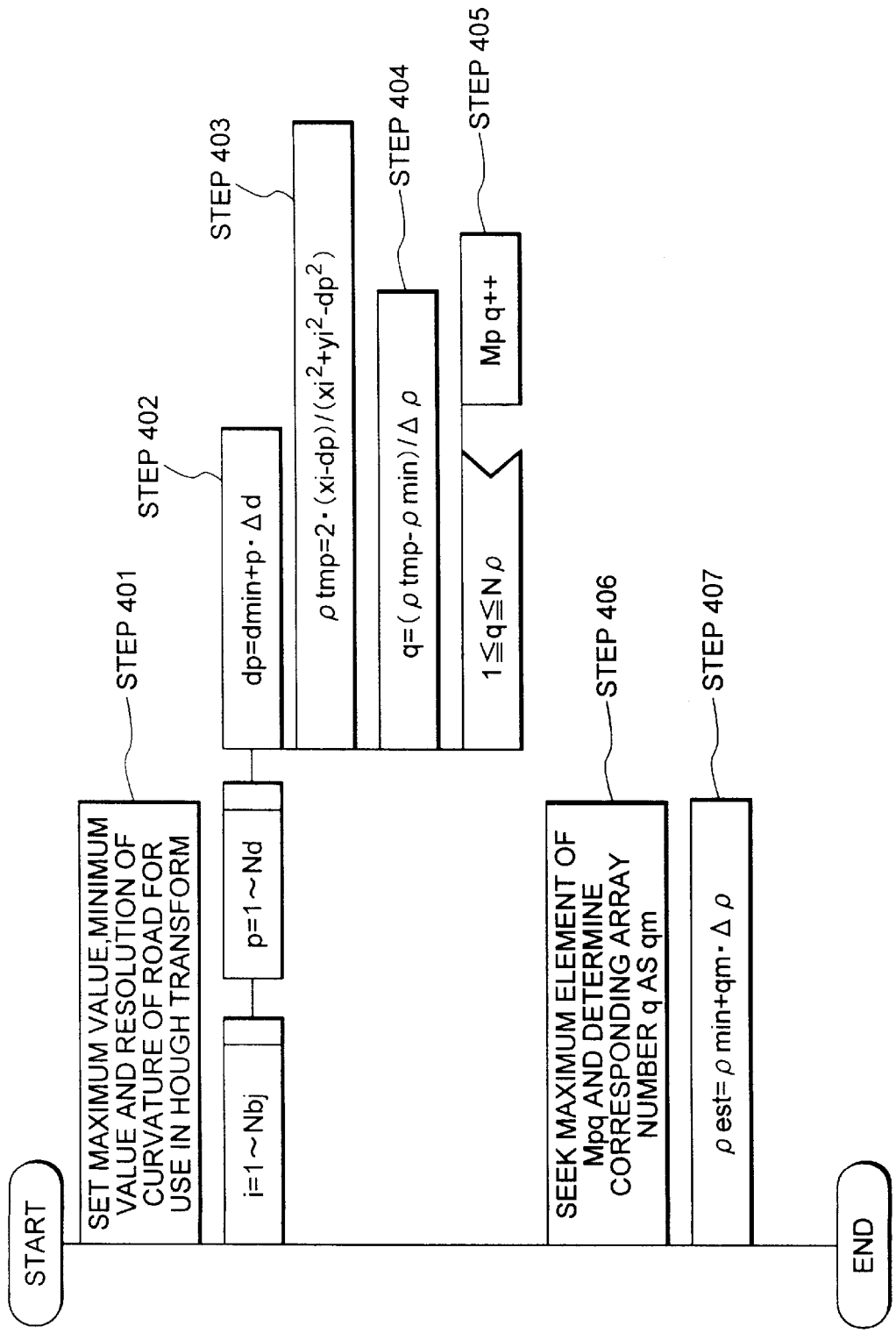

VEHICULAR FRONT MONITORING APPARATUS

BACKGROUND OF THE INVENTION

1. Field of the Invention

The present invention relates to a vehicular front monitoring apparatus for recognizing configurations of a road and detecting positions of vehicles and obstacles running and lying ahead of an own-vehicle.

2. Description of the Related Art

As vehicular front monitoring apparatuses for monitoring road situations ahead of an own-vehicle for the purposes of vehicle-to-vehicle distance control and so on, radar-type apparatuses using electromagnetic waves or ultrasonic waves and optical-type apparatuses using CCD cameras, etc. are well known heretofore. A number of techniques relating to such apparatuses are disclosed. In an optical-type front monitoring apparatus, a camera is attached to a front portion of a vehicle, and an image picked up by the camera is processed to extract, e.g., white lines delimiting lanes. Whether a road is straight or curved is determined through computation. Also, when a road is curved, the curvature of the curved road is computed. Accordingly, road situations ahead of an own-vehicle can be precisely detected.

In a radar-type front monitoring apparatus, electromagnetic waves or ultrasonic waves are radiated forward, and based on the waves reflected from an obstacle ahead of an own-vehicle, a motion and position of the obstacle relative to the own-vehicle are detected to determine whether the obstacle exists ahead in the lane where the own-vehicle is running. Regarding road configurations, the curvature of a road is computed based on outputs of a vehicle speed sensor and a yaw rate sensor both mounted on the own-vehicle. The position of the obstacle detected by a radar is corrected depending on the computed curvature of the road so that whether the obstacle exists ahead in the same lane as the own-vehicle is precisely determined. For example, assuming that the yaw rate detected by the yaw rate sensor is $\omega$ (rad/s) and the vehicle speed is Vs (m/s), a curvature $\rho$ is given by $\rho = \omega/Vs$.

Thus, when the above conventional vehicular front monitoring apparatuses are employed to recognize the curved condition of a road ahead, the following problems are encountered. The optical-type apparatuses can detect the curved condition before reaching a curved portion of the road, but it is necessarily expensive because of the necessity of a camera and an image processing unit. Also, in roads having no white lines to delimit lanes, for example, it is impossible to recognize road configurations. In radar-type apparatuses, since road configurations are judged by detecting the yaw rate as described above, the curvature of a curved road where the own-vehicle is now running can be recognized, but the curvature of a curved portion ahead cannot be detected until the own-vehicle enters the curved portion. Accordingly, a road configuration ahead of the own-vehicle cannot be recognized. For this reason, if a road structure such as a delineator installed on the shoulder of a curved road ahead is detected when an own-vehicle is running on a straight road leading to the curved road, the road structure may be erroneously recognized as a vehicle running ahead, whereupon an alarm is issued or useless slowdown control is performed. In other words, accuracy in front recognition has not been satisfactory.

In vehicular front monitoring apparatuses used in systems for alarming and controlling the vehicle-to-vehicle distance, it is necessary to determine the curvature of a road ahead of an own-vehicle with an inexpensive device. To this end, Japanese Unexamined Patent Publication Nos. 6-68398 and 8-249598 propose techniques to improve the drawbacks of the radar-type apparatuses described above. According to the techniques disclosed in those publications, a road configuration is estimated based on relative positions of delineators installed along a guardrail to an own-vehicle and relative positions of reflectors provided on a plurality of vehicles running ahead, or based on lateral displacements of the relative positions, or based on both the relative positions and the lateral displacements thereof, the delineators and reflectors being detected as parts of obstacles lying ahead by a radar device. With the disclosed techniques, a curved road ahead can be recognized using only a radar system without adding optical means. The disclosed techniques however require complicated computational processing for, e.g., determining whether the detected obstacle lying ahead is a road structure, determining whether the detected obstacle lying ahead is on the left or right side of a curved road, and computing a relative speed.

SUMMARY OF THE INVENTION

With the view of solving the above-described problems in the related art, an object of the present invention is to provide a vehicular front monitoring apparatus which can reliably recognize a road configuration ahead of an own-vehicle through simpler computation using only a radar system without adding optical means.

A vehicular front monitoring apparatus according to one aspect of the present invention comprises a distance measuring unit for radiating electromagnetic waves or the likes in plural directions, and detecting distances from an own-vehicle to a plurality of objects around the own-vehicle and lateral positions of the objects relative to a running direction of the own-vehicle, thereby measuring object positional data on coordinates defined by the running direction and a transverse direction of the own-vehicle; a road curvature estimating unit for estimating a curvature of a road ahead of the own-vehicle through Hough transform of the object positional data measured by the distance measuring unit; and a vehicle's own lane determining unit for determining whether other vehicles running ahead are in the same lane as the own-vehicle or not based on the curvature of the road estimated by the road curvature estimating unit.

A vehicular front monitoring apparatus according to another aspect of the present invention comprises a speed measuring unit for measuring a speed of an own-vehicle; a yaw rate measuring unit for measuring a yaw rate; a distance measuring unit for radiating electromagnetic waves or the likes in plural directions, and detecting distances from the own-vehicle to a plurality of objects around the own-vehicle and lateral positions of the objects relative to a running direction of the own-vehicle, thereby measuring object positional data ($x_i$, $y_i$) on coordinates defined by the running direction ($y_i$) and a lateral direction ($x_i$) to the running direction; a detected-object information storing unit for storing past object positional data measured by the distance measuring unit after transforming the past object positional data based on outputs of the speed measuring unit and the yaw rate measuring unit; a standstill determining unit for determining whether a detected object is stationary or not based on the past object positional data stored in the detected-object information storing unit and newest object positional data measured by the distance measuring unit; a road curvature estimating unit for estimating a curvature of a road ahead of the own-vehicle through Hough transform of the positional data of objects that have been determined to be stationary by the standstill determining unit; and a vehicle's own lane determining unit for determining whether other vehicles running ahead are in the same lane as the own-vehicle or not based on the curvature of the road estimated by the road curvature estimating unit.

A vehicular front monitoring apparatus according to still another aspect of the present invention comprises a speed measuring unit for measuring a speed of an own-vehicle; a yaw rate measuring unit for measuring a yaw rate; a distance measuring unit for radiating electromagnetic waves or the likes in plural directions, and detecting distances from the own-vehicle to a plurality of objects around the own-vehicle and lateral positions of the objects relative to a running direction of the own-vehicle, thereby measuring object positional data (xi, yi) on coordinates defined by the running direction (yi) and a lateral direction (xi) to the running direction; a detected-object information storing unit for storing past object positional data measured by the distance measuring unit after transforming the past object positional data based on outputs of the speed measuring unit and the yaw rate measuring unit; a standstill determining unit for determining whether a detected object is stationary or not based on the past object positional data stored in the detected-object information storing unit and newest object positional data measured by the distance measuring unit; a moving-object information storing unit for storing the positional data of objects, which have been determined to be not stationary by the standstill determining unit, after transforming the positional data of those objects based on outputs of the speed measuring unit and the yaw rate measuring unit; a road curvature estimating unit for estimating a curvature of a road ahead of the own-vehicle through Hough transform of newest positional data of objects that have been determined to be stationary by the standstill determining unit, newest positional data of the objects that have been determined to be not stationary by the standstill determining unit, and the past object positional data stored in the moving-object information storing unit; and a vehicle's own lane determining unit for determining whether other vehicles running ahead are in the same lane as the own-vehicle or not based on the curvature of the road estimated by the road curvature estimating unit.

A vehicular front monitoring apparatus according to still another aspect of the present invention comprises a speed measuring unit for measuring a speed of an own-vehicle; a yaw rate measuring unit for measuring a yaw rate; a distance measuring unit for radiating electromagnetic waves or the likes in plural directions, and detecting distances from the own-vehicle to a plurality of objects around the own-vehicle and lateral positions of the objects relative to a running direction of the own-vehicle, thereby measuring object positional data (xi, yi) on coordinates defined by the running direction (yi) and a lateral direction (xi) to the running direction; a first road curvature estimating unit for estimating a curvature of a road ahead of the own-vehicle through Hough transform of the object positional data measured by the distance measuring unit; a second road curvature estimating unit for estimating a curvature of a road based on outputs of the speed measuring unit and the yaw rate measuring unit, and changing an estimation range of the curvature of the road to be estimated by the first road curvature estimating unit; and a vehicle's own lane determining unit for determining whether other vehicles running ahead are in the same lane as the own-vehicle or not based on the curvature of the road estimated by the first road curvature estimating unit.

A vehicular front monitoring apparatus according to still another aspect of the present invention comprises a vehicle speed detecting unit for detecting a speed of an own-vehicle; a distance measuring unit for radiating electromagnetic waves or the likes in plural directions, and detecting distances from the own-vehicle to a plurality of objects around the own-vehicle and lateral positions of the objects relative to a running direction of the own-vehicle, thereby measuring object positional data (xi, yi) on coordinates defined by the running direction (yi) and a lateral direction (xi) to the running direction; a road curvature estimating unit for estimating a curvature of a road ahead of the own-vehicle through Hough transform of the object positional data measured by the distance measuring unit; and a vehicle's own lane determining unit for determining whether other vehicles running ahead are in the same lane as the own-vehicle or not based on the curvature of the road estimated by the road curvature estimating unit, wherein an estimation range and estimation accuracy of the curvature of the road to be estimated by the road curvature estimating unit is changed depending on the vehicle speed detected by the speed detecting unit.

Preferably, assuming that coordinates of the detected object positional data with an origin point defined as a position of the own-vehicle are (xi, yi), the curvature of the road is $\rho$, and a lateral shift amount of the detected object from a center of the own-vehicle is di, the road curvature estimating unit performs Hough transform using the following relational formula:

$$(xi-1/\rho)^2 + yi^2 = (1/\rho - di)^2$$

Also, preferably, the fact that the detected object is stationary is determined by comparing the past object positional data stored in the detected-object information storing unit and the newest object positional data.

Further, preferably, the past object positional data stored in the detected-object information storing unit is stored after being transformed into data on coordinates with an origin point defined as a position of the own-vehicle, based on a distance of movement of the own-vehicle obtained by the own-vehicle speed measuring unit and a change in running direction of the own-vehicle obtained by the yaw rate detecting unit.

Still further, preferably, the yaw rate is measured by a yaw rate sensor mounted on a vehicle.

Still further, preferably, the yaw rate is measured based on outputs of a steering wheel sensor and a vehicle speed sensor.

BRIEF DESCRIPTION OF THE DRAWINGS

FIG. 1 is a block diagram showing the construction of a vehicular front monitoring apparatus according to Embodiment 1 of the present invention;

FIGS. 3A and 3B are representations for explaining Hough transform performed in Embodiment 1 of the present invention;

FIG. 17 is a PAD for explaining the operation of Embodiment 5 of the present invention.

DESCRIPTION OF THE PREFERRED EMBODIMENTS

Embodiment 1

Figure 2A:
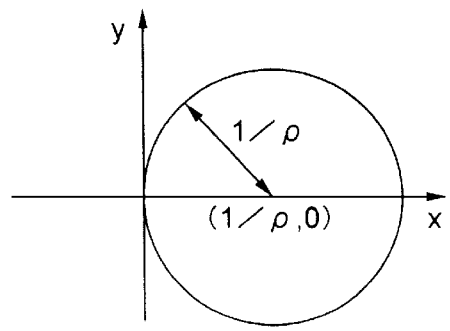
FIGS. 2A to 2D are representations for explaining the operation of Embodiment 1 of the present invention.

FIG. 1 is a block diagram showing the construction of a vehicular front monitoring apparatus according to Embodiment 1 of the present invention, and FIGS. 2 to 5 are representations for explaining the operation of this embodiment. Referring to FIG. 1, numeral 1 denotes a distance measuring means for radiating, e.g., near-infrared rays to surroundings of an own-vehicle in plural directions and, detecting the rays reflected from a plurality of objects existing around the own-vehicle, thereby detecting distances from the own-vehicle to the objects and positions of the objects relative to the own-vehicle in the lateral direction. Specifically, the distance measuring means 1 measures and outputs positions (xi, yi) of a plurality of detected objects on coordinates in which an x-axis indicates the transverse direction of the own-vehicle and a y-axis indicates the running direction thereof. The distance measuring means 1 comprises, for example, a scan laser radar or the like. Numeral 2 denotes a road curvature estimating means for estimating through computation the curvature of a road ahead based on object positional data detected by the distance measuring means 1. Numeral 3 denotes a vehicle's own lane determining means for receiving an output of the distance measuring means 1 and an output of the road curvature estimating means 2, and determining whether the detected objects exist in a lane where the own-vehicle is running. Numeral 4 denotes an output means for outputting the positional data of the detected objects and a result of determination on the vehicle's own lane through serial communication in accordance with RS232C, for example. The road curvature estimating means 2, the vehicle's own lane determining means 3, and the output means 4 are constituted as functions included in a control unit with a built-in microcomputer.

The road curvature estimating means 2 computes the curvature of a road as follows. Assuming a circular road having a curvature ρ as shown in FIG. 2A, a point on a circumference of the circular road is expressed by the following formula:

$$(x-1/\rho)^2+y^2=(1/\rho)^2 \tag{1}$$

Figure 2B:
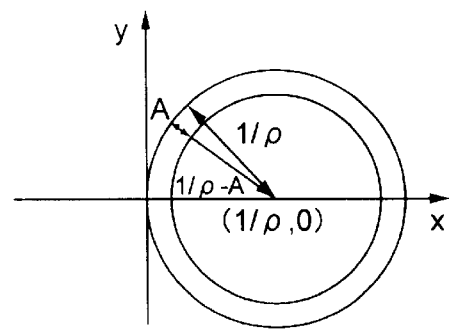

Also, a point on a circumference of another circle having the same center but a different A in radius, as shown in FIG. 2B, is expressed by the following formula:

$$(x-1/\rho)^2+y^2=(1/\rho-A)^2 \tag{2}$$

Figure 2C:
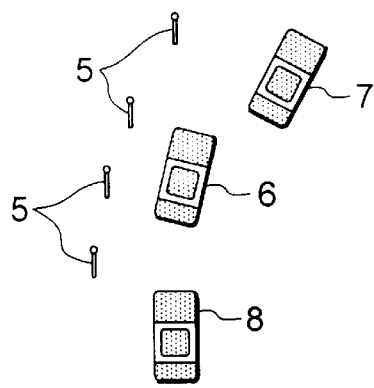

Thus, since objects on the road such as delineators 5 and other vehicles 6 and 7, shown in FIG. 2C, can be thought as existing on concentric circles spaced by respective differences A, positions of those objects can be estimated as follows with the position of an own-vehicle 8 set as an origin point.

Assuming that a lateral shift amount of each detected object on the road relative to a center line of the own-vehicle 8 is d, the position of the object is expressed by the following formula on the coordinates in which an x-axis indicates the transverse direction of the own-vehicle and a y-axis indicates the running direction thereof:

$$(x-1/\rho)^2+y^2=(1/\rho-d)^2 \tag{3}$$

Figure 2D:
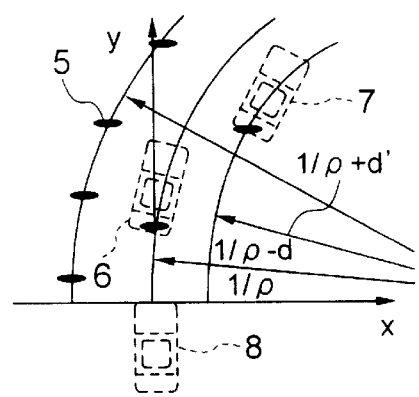

Namely, the detected objects can be thought as existing on respective circumferences shown in FIG. 2D. In this embodiment, the road curvature estimating means 2 estimates the curvature ρ of the road by plotting the positions of the detected objects as points on x-y coordinates as shown in FIG. 3A, and then performing Hough transform of those points on the x-y coordinates into lines on coordinates in which a horizontal axis indicates the lateral shift amount d and a vertical axis indicates the curvature ρ. In the estimating step, the curvature ρ is computed using the following formula (4) rewritten from the above formula (3):

$$\rho=2\cdot(x-d)/(x^2+y^2-d^2) \tag{4}$$

Figure 4:
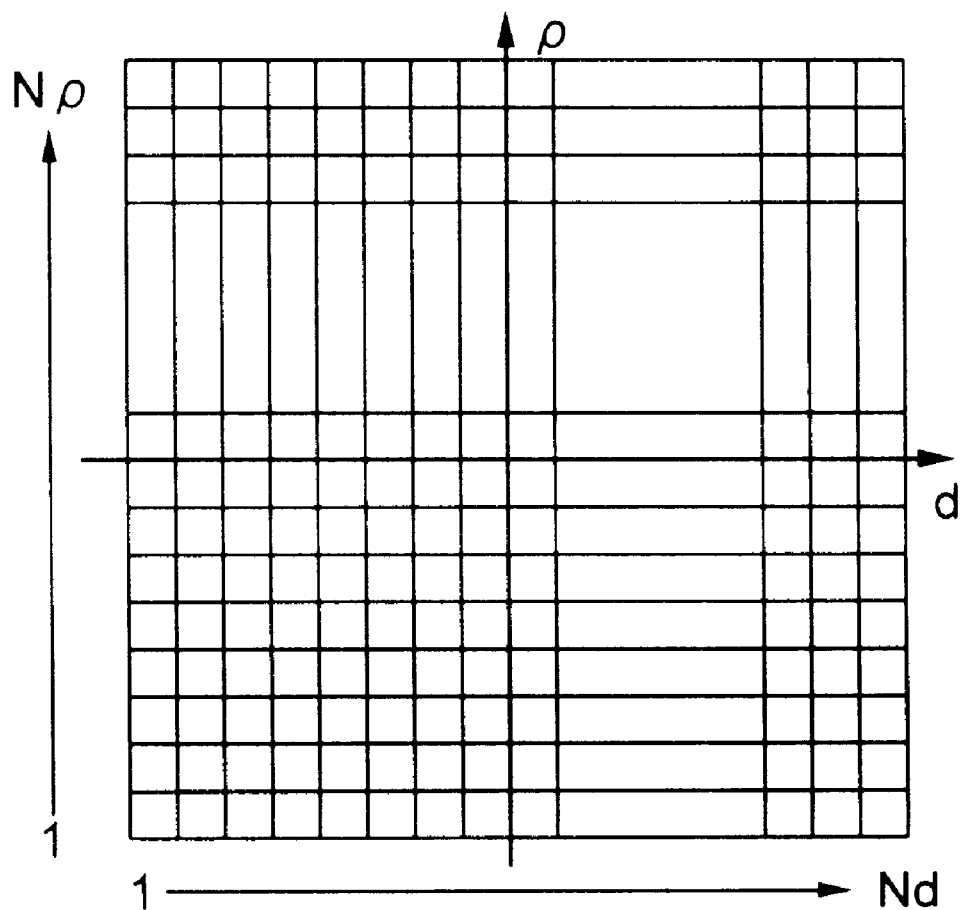
FIG. 4 is a representation for explaining the operation of Embodiment 1 of the present invention.

More specifically, the road curvature estimating means sets a plane (d-ρ plane), which is defined by the lateral shift amount d from the center line of the own-vehicle and the curvatur ρ of the road, for performing Hough transform of data (xi, yi) of the detected objects. Then, as shown in FIG. 4, the road curvature estimating means 2 divides the plane into a number Nd of zones in the d-direction and a number Nρ of zones in the ρ-direction. In other words, the d-ρ plane is divided into Nd×Nρ zones of a mesh pattern. Further, a memory array Mpq (p=1 to Nd and q=1 to Nρ) is set corresponding to the respective mesh zones. Values of Nd and Nρ are determined from the following formulae:

$$Nd=(d\text{max}-d\text{min})/\Delta d \tag{5}$$

$$N\rho=(\rho\text{max}-\rho\text{min})/\Delta\rho \tag{6}$$

Here, dmax is a maximum value of the lateral shift amount from the center line of the own-vehicle, dmin is a minimum value of the lateral shift amount from the center line of the own-vehicle, Δd is a resolution of the lateral shift amount from the center line of the own-vehicle, ρmax is a maximum value of the curvature of the road, ρmin is a minimum value of the curvature of the road, and Δρ is a resolution of the curvature of the road. The maximum and minimum values of d, ρ are set based on the curvatures and widths of actual roads by referencing to examples of road structure, and the respective resolutions are decided based on a memory area and a computing speed usable in the estimating step.

Figure 5:
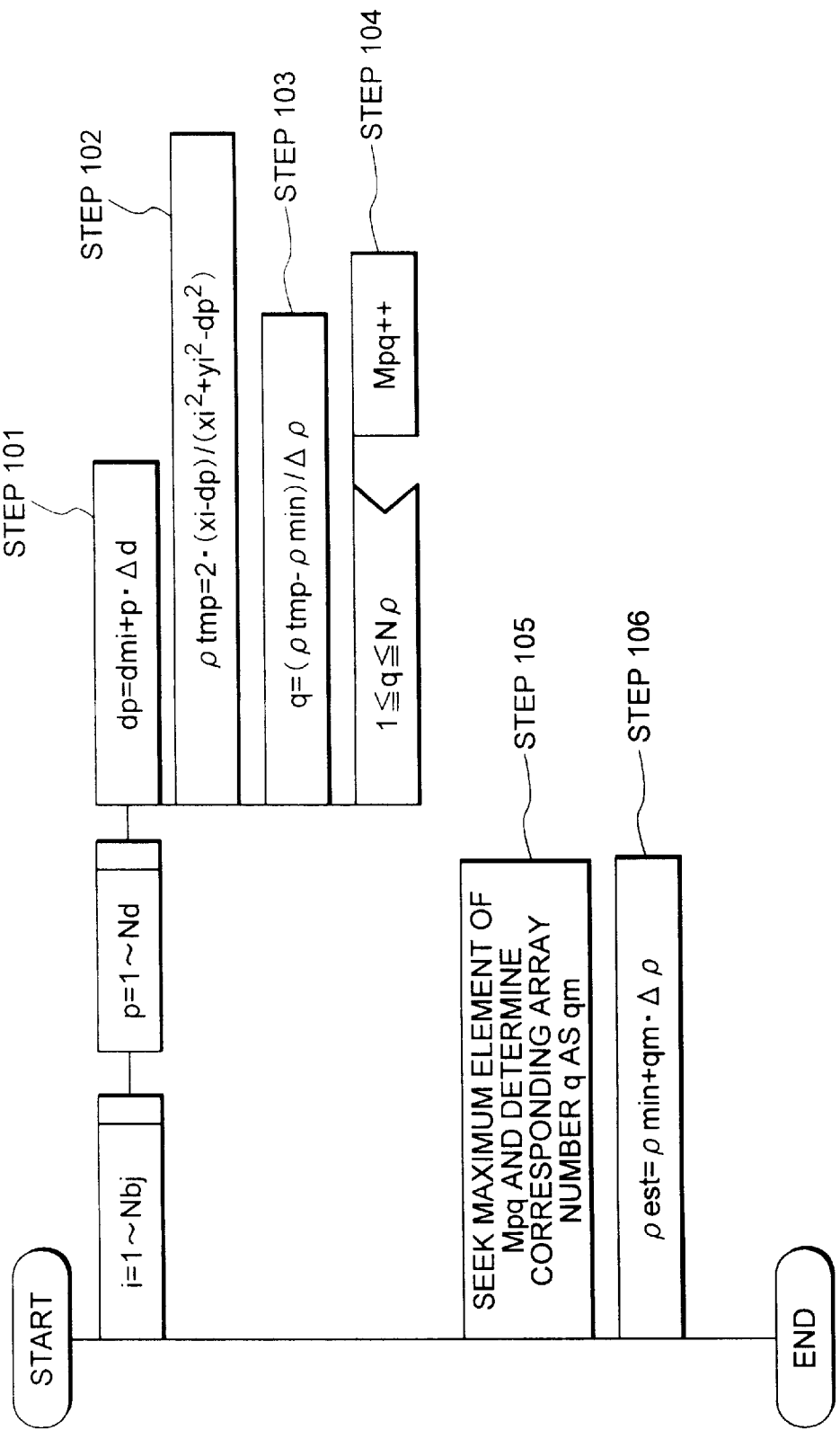
FIG. 5 is a PAD (Program Analysis Diagram) for explaining the operation of Embodiment 1 of the present invention.

Details of processing for estimating the curvature of the road will be described with reference to a PAD (Problem Analysis Diagram) shown in FIG. 5. In this processing, computation is carried out as given below using the positional data (xi, yi) of all detected objects. Here, i=1 to Nbj is assumed and Nbj is the number of objects detected. First, in step 101 of FIG. 5, a value of dp for p of the above-mentioned memory array Mpq is obtained using the following formula (7):

$$dp = d\min + p \cdot \Delta d \quad (7)$$

Subsequently, in step 102, a value of ρtmp is calculated using the following formula (8), which is on the basis of the above formula (4), from the value of dp and the positional data (xi, yi):

$$\rho tmp = 2 \cdot (xi - dp)/(xi^2 + yi^2 - dp^2) \quad (8)$$

In step 103, an array number q corresponding to the calculated value of ρtmp is obtained using the following formula (9):

$$q = (\rho tmp - \rho \min)/\Delta \rho \quad (9)$$

If the obtained value of q is within the range of 1 to Nρ, a value of the corresponding array element of Mpq is incremented in step 104. After the computation is completed for all the detected objects, an array element of Mpq having a maximum value is sought and an array number qm corresponding to that array element is found in step 105. From the array number qm, the curvature ρest of the road is determined in step 106 using the following formula:

$$\rho est = \rho \min + qm \cdot \Delta \rho \quad (10)$$

The vehicle's own lane determining means 3 computes the lateral shift amount d from the center line of the own-vehicle for each detected object based on the positional data (xi, yi) of the detected object and the curvature ρ of the road determined by the road curvature estimating means 2. This computation is performed using the following formula (11) obtained by rewriting the above formula (3):

$$d\pm = 1/\rho \pm \sqrt{(xi - 1/\rho)^2 + yi^2} \quad (11)$$

Here, one of d+ and d− which has a smaller absolute value is selected as d, and if the lateral shift amount d is smaller than a predetermined value dth, it is determined that the detected object is in the vehicle's own lane. Further, the output means 4 outputs the number of the detected objects, the distances to the respective detected objects, the positions of the detected objects relative to the own-vehicle in the lateral direction, and the results of determination as to whether the detected objects are in the vehicle's own lane, through serial communication in accordance with the predetermined communication specifications.

With the vehicular front monitoring apparatus according to Embodiment 1 of the present invention, as described above, since a road configuration is computed from array information of objects ahead of an own-vehicle measured by the distance measuring means 1, it is possible at an entry position of a curved road to estimate the curvature of the road with higher accuracy, and to improve accuracy in determining whether another vehicle running ahead is in the same lane as the own-vehicle. Also, processing can be further developed so as to determine a relative speed based on correspondence to the object detected previously and the object detected at the current time. Further, the curvature of the road can be estimated with simple processing without needing complicated processing to determine whether the detected object is on the left or right side of the own-vehicle at the center. In the above description, ρtmp is determined with the lateral shift amount d used as a parameter, and a value of the corresponding memory array element is changed. However, a similar advantage can also be achieved by determining dtmp with the curvature ρ of the road used as a parameter, and changing a value of the corresponding memory array element.

Embodiment 2

Figure 6:
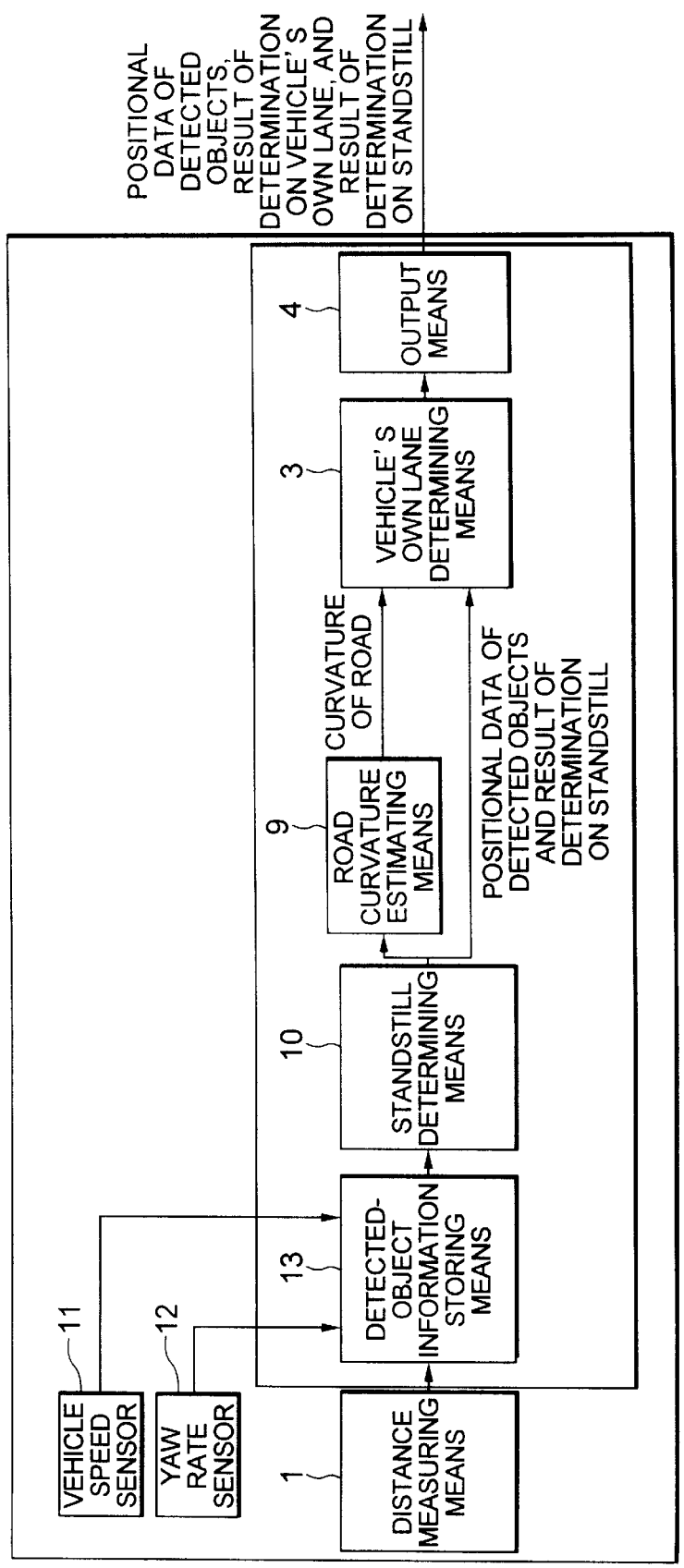
FIG. 6 is a block diagram showing the construction of a vehicular front monitoring apparatus according to Embodiment 2 of the present invention.
Figure 7:
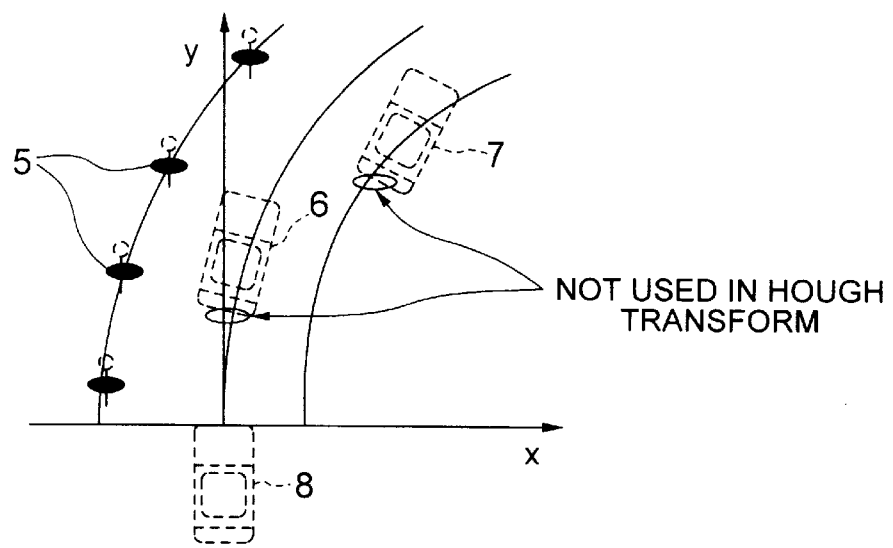
FIG. 7 is a representation for explaining the operation of Embodiment 2 of the present invention.

FIG. 6 is a block diagram showing the construction of a vehicular front monitoring apparatus according to Embodiment 2 of the present invention, and FIGS. 7 to 10 are representations for explaining the operation this embodiment. Referring to FIG. 6, numeral 1 denotes the same distance measuring means as used in Embodiment 1. Numeral 9 denotes a road curvature estimating means for estimating the curvature of a road ahead based on positional data of objects that have been determined to be stationary by a standstill determining means 10 (described later), the positional data of those objects being included in object positional data detected by the distance measuring means 1. Numeral 3 denotes the same vehicle's own lane determining means as used in Embodiment 1, and numeral 4 denotes the same output means as used in Embodiment 1. Numeral 11 denotes a vehicle speed sensor for detecting the speed of an own-vehicle, and numeral 12 denotes a yaw rate sensor for detecting the yaw rate of the own-vehicle. Numeral 13 denotes a detected-object information storing means for storing the positional data of all objects detected by the distance measuring means 1 in the past. Numeral 10 denotes a standstill determining means for determining whether an object detected at the current time is stationary or not using the past object positional data stored in the detected-object information storing means 13, an output of the vehicle speed sensor 11 and an output of the yaw rate sensor 12. Of the above components, the road curvature estimating means 9, the vehicle's own lane determining means 3, the output means 4, the standstill determining means 10, and the detected-object information storing means 13 are constituted as functions included in a control unit with a built-in microcomputer.

The road curvature estimating means 9 in this embodiment receives, as input data, the positional data of objects that have been determined to be stationary by the standstill determining means 10. In other words, the road curvature estimating means 9 is the same as the one 2 described in Embodiment 1 except that the former means 9 receives positional data of stationary objects, such as delineators 5 provided in the shoulder of a road shown in FIG. 7, for use in Hough transform, but does not employ positional data of moving objects, such as other vehicles 6 and 7, in Hough transform. Also, the output means 4 is the same as the one 4 described in Embodiment 1 except for outputting a standstill determination result made by the standstill determining means 10.

Figure 8:
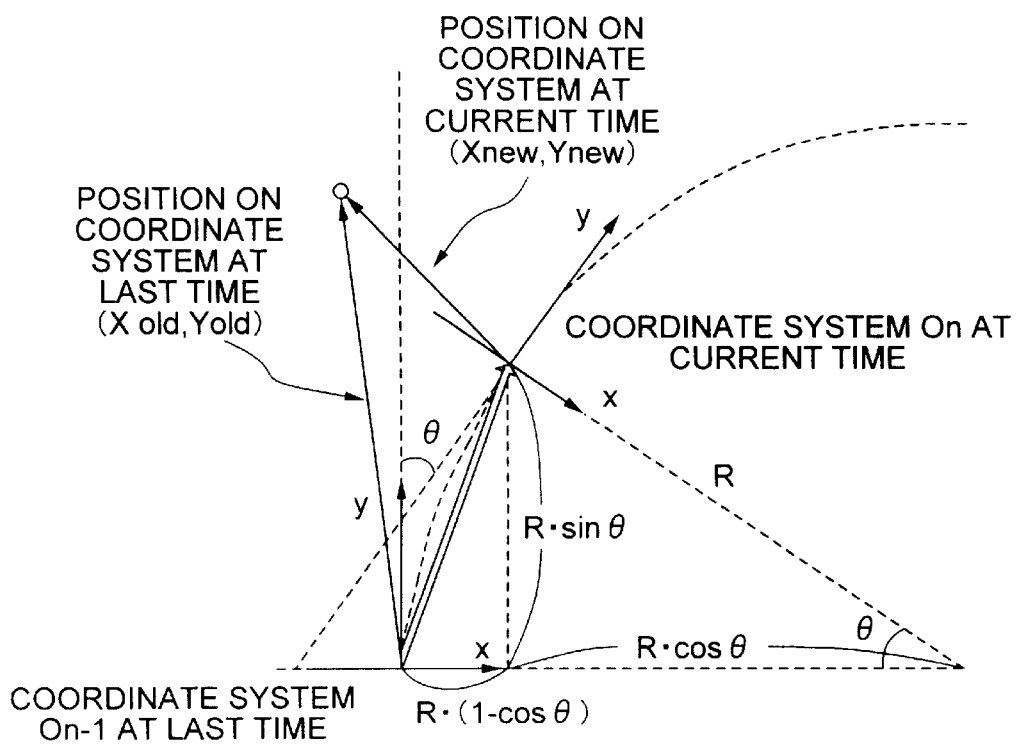
FIG. 8 is a representation for explaining the operation of Embodiment 2 of the present invention.

The detected-object information storing means 13 stores the positional data of all objects detected by the distance measuring means 1 in the past. On that occasion, for the purpose of simplifying later-described processing to be executed by the standstill determining means 10, the detected-object information storing means 13 stores the positions detected in the past after transforming them into positions on coordinates in which an origin point is defined as the position of the own-vehicle at the current detection time, based on a distance by which the own-vehicle has moved and a change in running direction of the own-vehicle from the last detection time. FIG. 8 is a representation for explaining such coordinate position transform in detail. Assuming that a change in running direction of the own-vehicle is θ when the own-vehicle has moved along a radius R of curvature until the current detection time after the lapse of time $\Delta t$ (sec) from the last detection time, a position (xold, yold) detected at the time $\Delta t$ before is transformed into a current position (xnew, ynew) using the following formula:

$$\begin{pmatrix} x\text{new} \\ y\text{new} \end{pmatrix} = \begin{pmatrix} \cos\theta & -\sin\theta \\ +\sin\theta & \cos\theta \end{pmatrix} \cdot \begin{pmatrix} x\text{old} - R(1-\cos\theta) \\ y\text{old} - R\cdot\sin\theta \end{pmatrix} \quad (12)$$

Then, a distance dL by which the own-vehicle has moved and a change $\theta$ in running direction of the own-vehicle are expressed by the following formulae using a vehicle's own speed Vs (m/s) and a yaw rate $\omega$ (rad/s):

$$dL = Vs \cdot \Delta t = T \cdot \theta \quad (13)$$

$$\theta = \omega \cdot \Delta t \quad (14)$$

Assuming $\theta$ to be very small, the above formula (12) can be rewritten as follows:

$$\begin{pmatrix} x\text{new} \\ y\text{new} \end{pmatrix} = \begin{pmatrix} x\text{old} + y\text{old}\cdot\omega\cdot\Delta t + Vs\cdot\Delta t\cdot\omega\cdot\Delta t \\ x\text{old}\cdot\omega\cdot\Delta t + y\text{old} - Vs\cdot\Delta t \end{pmatrix} \quad (15)$$

The detected-object information storing means 13 stores the object positional data, which has been stored until the last detection time, after transforming that data using the above formula (15) for each processing cycle, and also stores the positional data of an object detected at the current time as it is.

Figure 9:
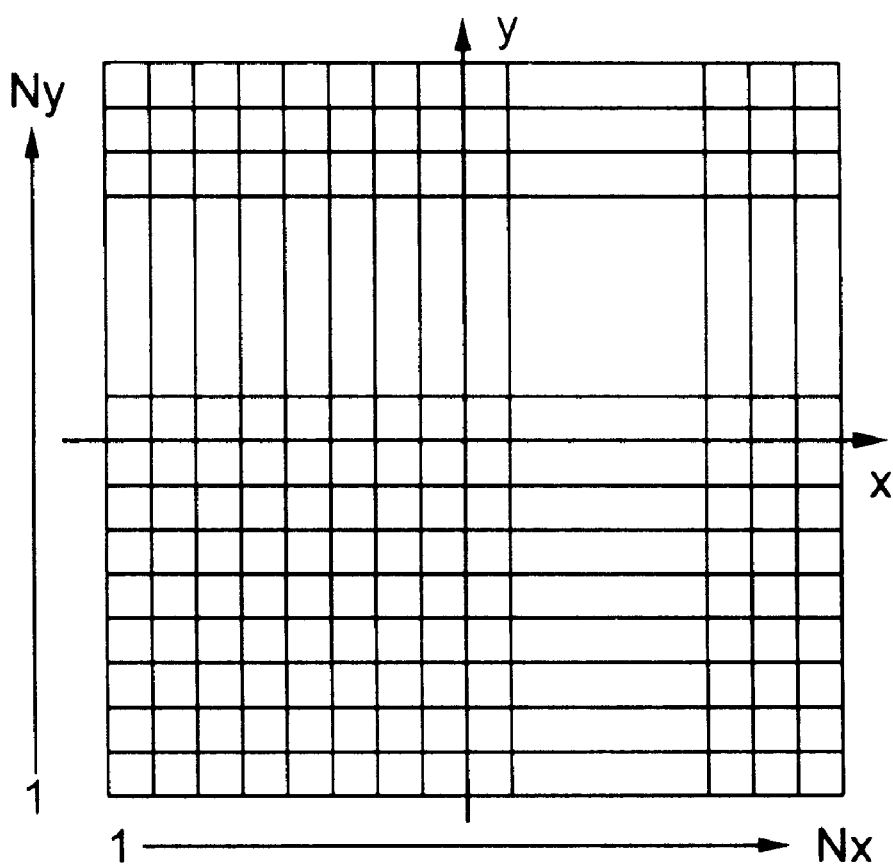
FIG. 9 is a representation for explaining the operation of Embodiment 2 of the present invention.

Thus, since the detected-object information storing means 13 always stores the positions of objects detected in the past after transforming them using the above formula (15) into positions on coordinates in which an origin point is defined as the current position of the own-vehicle, the object position at the last detection time and the object position at the current detection time coincide with each other if the object is stationary. When such a coincidence reaches a predetermined number of times, the standstill determining means 10 determines that the detected object is stationary. More specifically, in the standstill determining means 10, an x-y plane for representing the object positional data thereon is divided into a number Nx of zones in the x-direction and a number Ny of zones in the y-direction, i.e., into Nx×Ny zones of a mesh pattern as shown in FIG. 9. Further, a memory array M'pq (p=1 to Nx and q=1 to Ny) is set corresponding to the respective mesh zones.

Values of Nx and Ny are determined from the following formulae:

$$Nx = (x\max - x\min)/\Delta x \quad (16)$$

$$Ny = (y\max - y\min)/\Delta y \quad (17)$$

Here, xmax is a maximum value of x, xmin is a minimum value of x, $\Delta x$ is a resolution of x, ymax is a maximum value of y, ymin is a minimum value of y, and $\Delta y$ is a resolution of y. The maximum and minimum values of x are set based on the curvatures and widths of actual roads by referencing to examples of road structure. The maximum value of y is set to the maximum detection distance of the distance measuring means 1, and the minimum value of y is set to 0. Also, the resolutions of x and y are decided based on the measurement accuracy of the distance measuring means 1.

Figure 10:
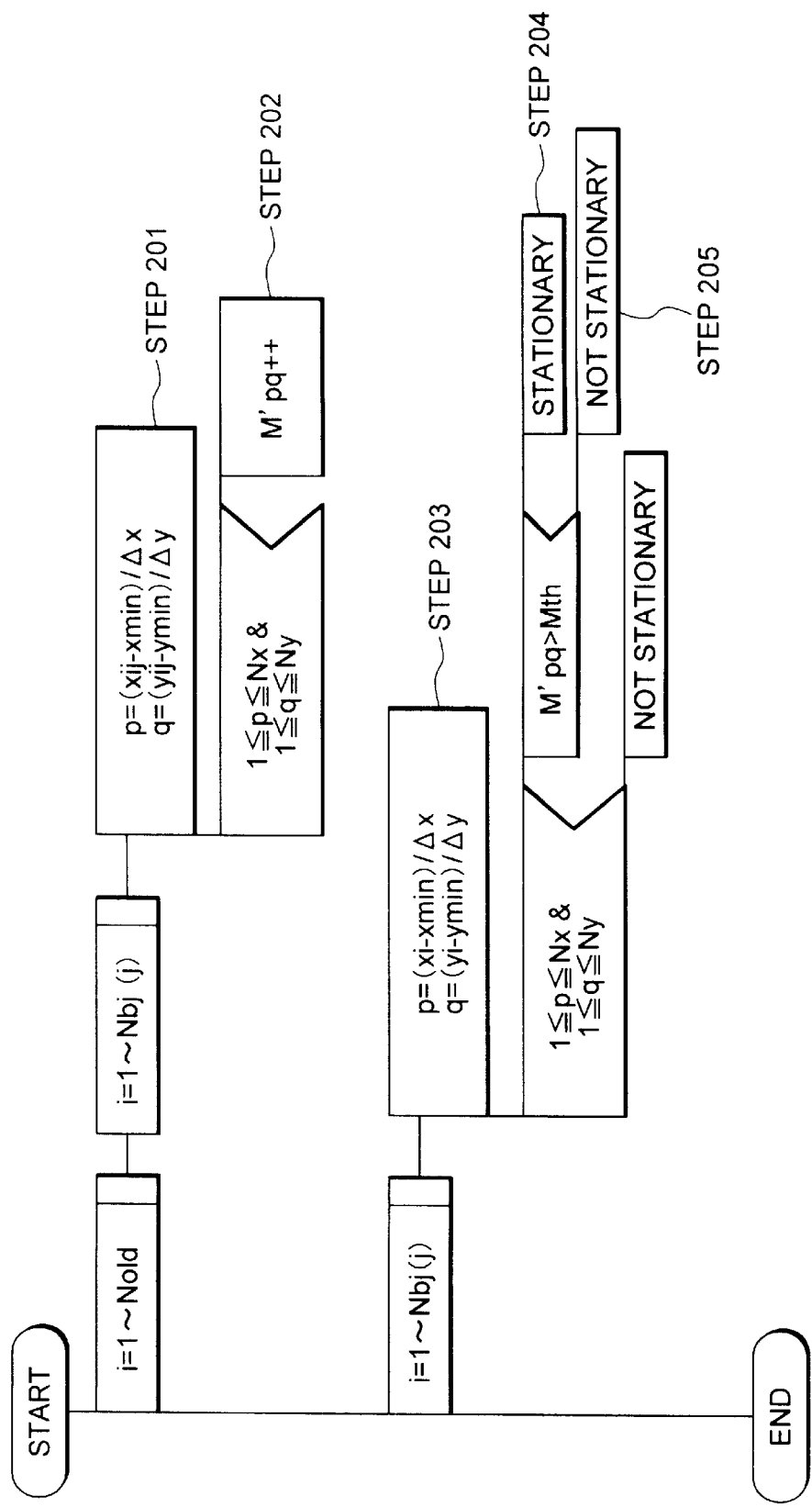
FIG. 10 is a PAD for explaining the operation of Embodiment 2 of the present invention.

Actual processing for determining whether the detected object is stationary or not will be described with reference to a PAD shown in FIG. 10. In this processing, computation is carried out as given below using the positional data (xij, yij) of all objects detected in the past and stored in the detected-object information storing means 13. Here, i=1 to Nbj and j=1 to Nold are assumed, Nbj is the number of objects detected, and Nold is the number of past data stored. First, in step 201 of FIG. 10, from each of the object positional data, corresponding array numbers p, q are determined using the following formulae:

$$p = (xij - x\min)/\Delta x \quad (18)$$

$$q = (yij - y\min)/\Delta y \quad (19)$$

If $1 \leq p \leq Nx$ and $1 \leq q \leq Ny$ are satisfied, a value of the corresponding element of the memory array M'pq is incremented in step 202. In step 203, for each value of the newest positional data (xi, yi) of the detected object, p, q are determined using the above formulae (18) and (19). Then, in steps 204 and 205, if a value of the element of the memory array M'pq represented by p, q is not less than a predetermined value Mth, the detected object is determined to be stationary. Thereafter, based on the positional data of the stationary object, the curvature of a road is estimated and the position of another vehicle running ahead is determined in the same manner as in Embodiment 1.

With the vehicular front monitoring apparatus according to Embodiment 2 of the present invention, as described above, whether a detected object is stationary or not is determined and the curvature of a road is estimated from information of the stationary object on the road without complicated processing that has been needed in the related art, i.e., without processing to make the object detected in the past correspondent to the object detected at the current time and to determine a relative speed based on an amount by which the object has moved during a time from the past detection to the current detection. As a result, a road configuration can be recognized with high accuracy through simple processing. While the change $\theta$ in running direction of the own-vehicle per unit time is determined by the yaw rate sensor 12 in the above description, the yaw rate may be determined by providing a steering angle sensor and using the following formula (20) that includes parameters regarding a steering wheel angle, a vehicle speed and a vehicle itself;

$$\omega = Vs \cdot K\delta/(1 + A \cdot Vs^2)/Lwb \quad (20)$$

where K is the coefficient for converting a steering wheel angle into an actual steering angle in units of rad, $\delta$ is the steering wheel angle (rad), A is the stability factor of the vehicle, and Lwb is the wheelbase of the vehicle.

Embodiment 3

Figure 11:
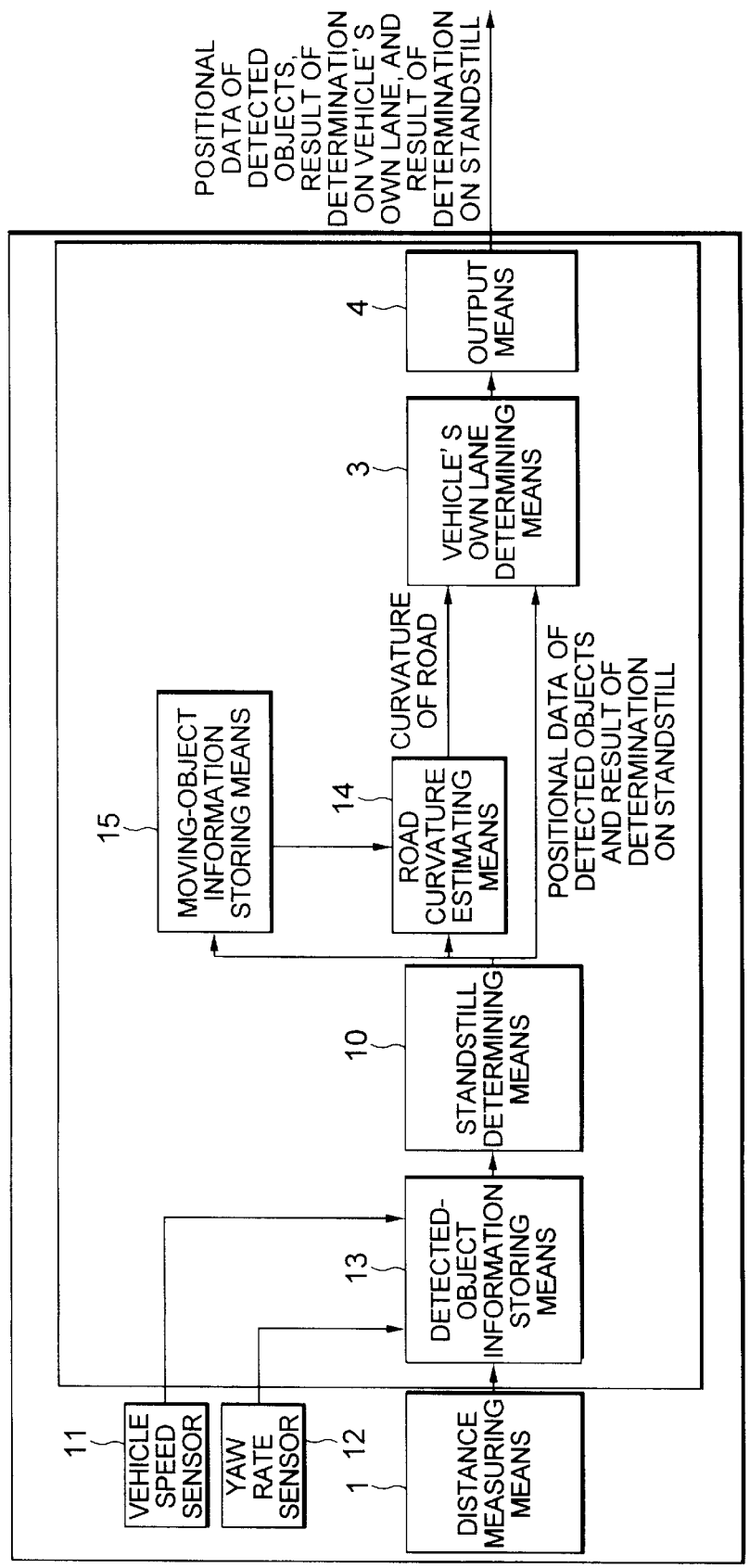
FIG. 11 is a block diagram showing the construction of a vehicular front monitoring apparatus according to Embodiment 3 of the present invention.
Figure 12:
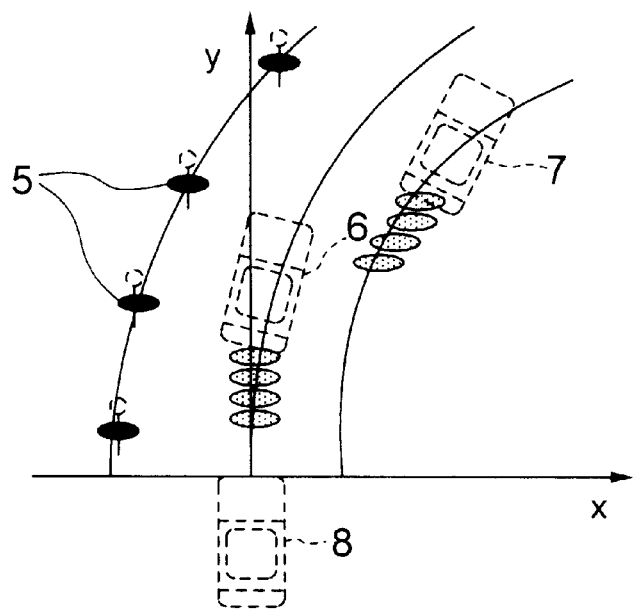
FIG. 12 is a representation for explaining the operation of Embodiment 3 of the present invention.

FIG. 11 is a block diagram showing the construction of a vehicular front monitoring apparatus according to Embodiment 3 of the present invention, and FIG. 12 is a representation for explaining the operation of this embodiment. Referring to FIG. 11, numeral 1 denotes the same distance measuring means as used in Embodiment 1. Numeral 11 denotes a vehicle speed sensor for detecting the speed of an own-vehicle, and numeral 12 denotes a yaw rate sensor for detecting the yaw rate of the own-vehicle. Numeral 13 denotes a detected-object information storing means, 10 denotes a standstill determining means, 3 denotes a vehicle's own lane determining means, and 4 denotes an output means. These components are the same as those described above in Embodiments 1 and 2. Numeral 15 denotes a moving-object information storing means for storing positional information of objects that have been determined to be not stationary by the standstill determining means 10, i.e., moving objects. Numeral 14 denotes a road curvature estimating means for estimating the curvature of a road ahead based on the newest positional data of stationary objects that have been determined to be stationary by the standstill determining means 10, the newest positional data of moving objects that have been determined to be not stationary by the standstill determining means 10, and past positional data of moving objects stored in the moving-object information storing means 15, these positional data being included in object positional data detected by the distance measuring means 1.

In the vehicular front monitoring apparatus according to this embodiment, the moving-object information storing means 15 stores data of past positions of detected objects, which have been determined to be not stationary by the standstill determining means 10, after transforming them into positions on coordinates in which an origin point is defined as the position of the own-vehicle at the current detection time, using the formula (12) to (15) described above in Embodiment 2. This transforming process is carried out for each processing cycle, and the newest positional data is stored as it is. The road curvature estimating means 14 receives the respective object positional data including the newest positional data of stationary objects that have been determined to be stationary by the standstill determining means 10, the newest positional data of moving objects that have been determined to be not stationary by the standstill determining means 10, and the past positional data of moving objects stored in the moving-object information storing means 15. Then, the road curvature estimating means 14 estimates the curvature of a road through similar processing as described above in Embodiment 1, and the positions of vehicles running ahead are determined by the vehicle's own lane determining means.

Thus, as shown in FIG. 12, a road configuration is estimated in this embodiment based on positional information of stationary objects, e.g., road structures such as delineators 5 provided in the shoulder of a road, and of moving objects such as other vehicles 6 and 7 running ahead. For example, even when a vehicle runs on a road along which road structures such as the delineators 5 are not provided, the curvature of the road can be estimated from the positional information of the other vehicles 6 and 7 running ahead on the road.

Embodiment 4

Figure 13:
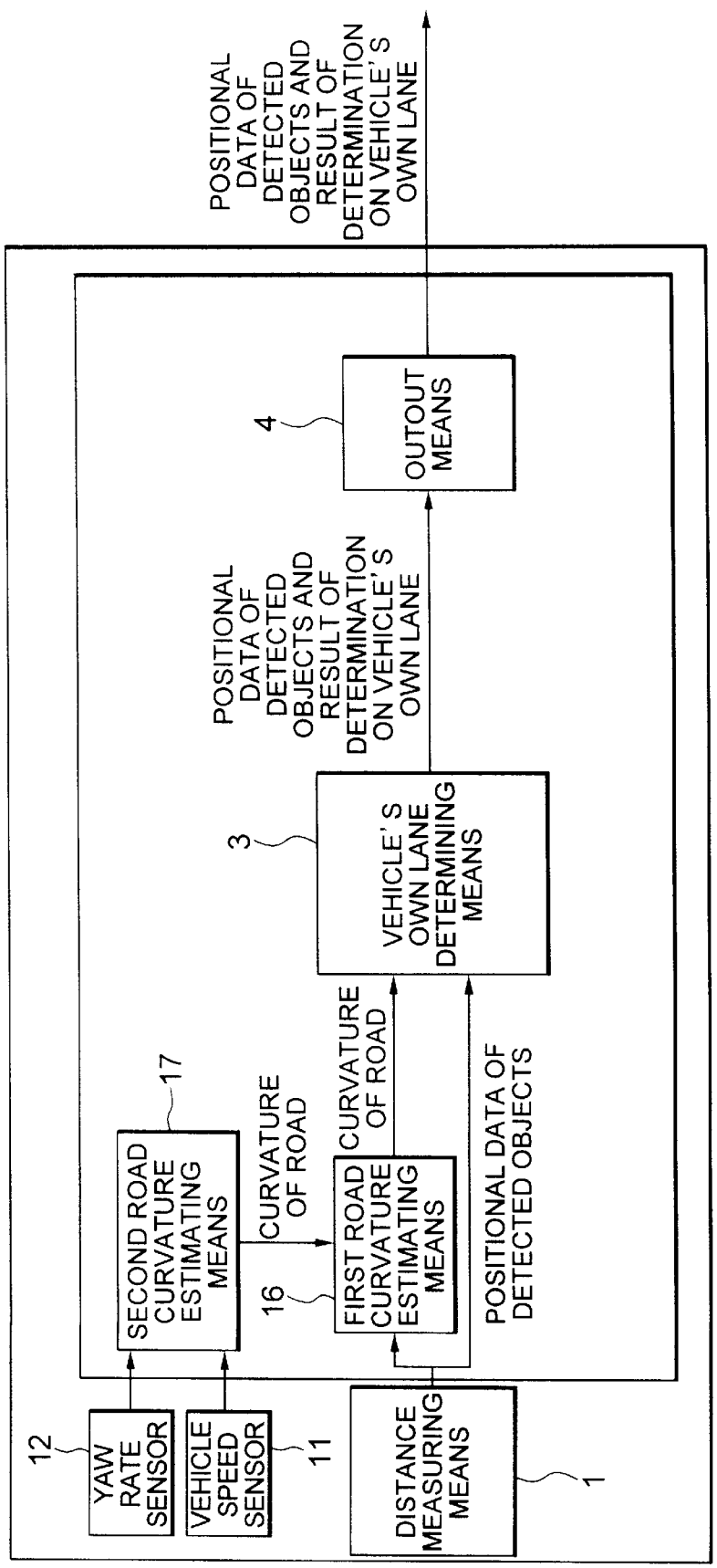
FIG. 13 is a block diagram showing the construction of a vehicular front monitoring apparatus according to Embodiment 4 of the present invention.
Figure 14:
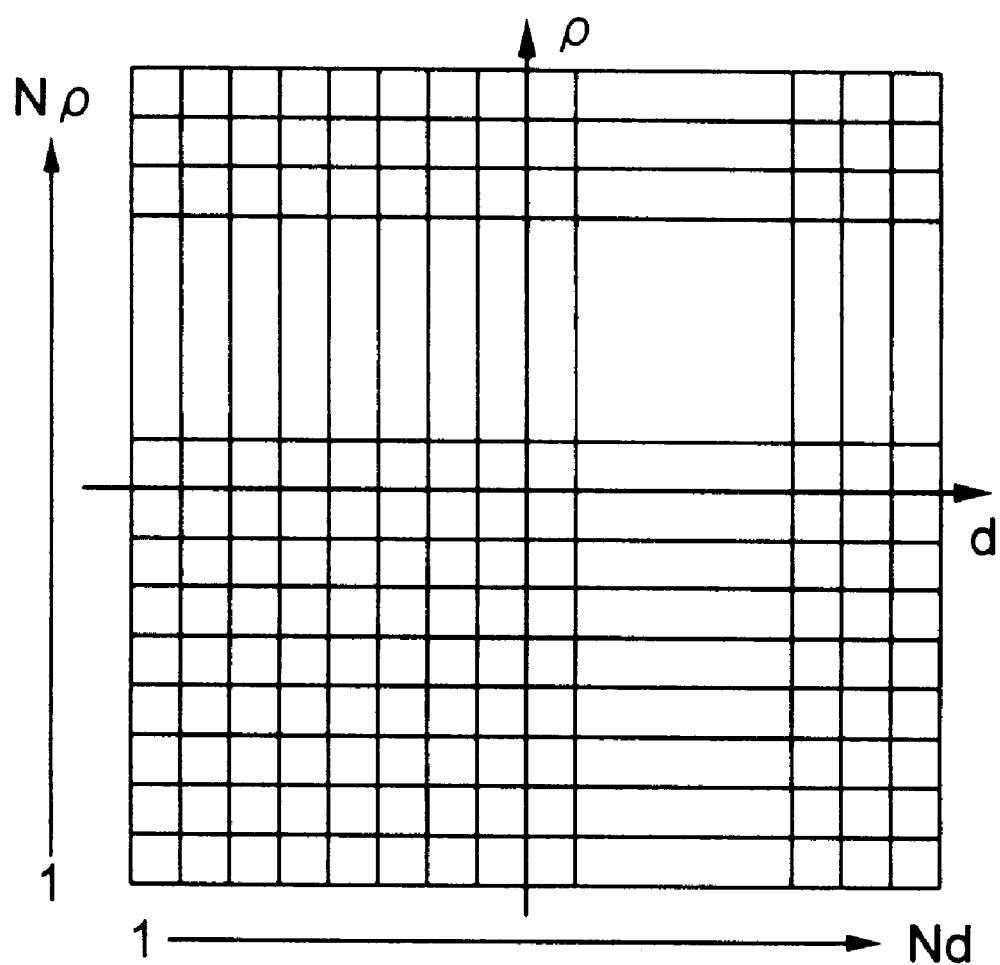
FIG. 14 is a representation for explaining the operation of Embodiment 4 of the present invention.
Figure 15:
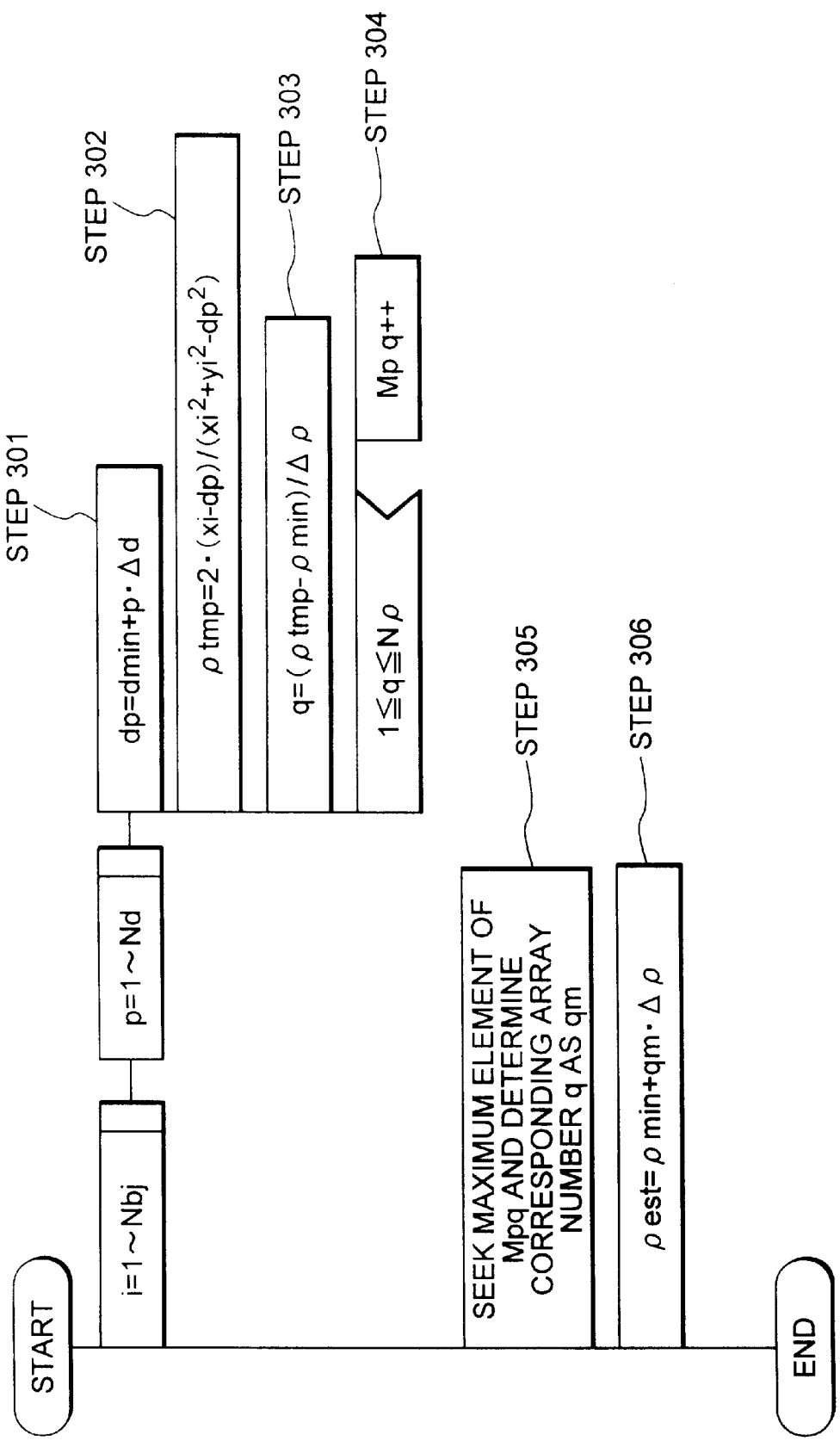
FIG. 15 is a PAD for explaining the operation of Embodiment 4 of the present invention.

FIG. 13 is a block diagram showing the construction of a vehicular front monitoring apparatus according to Embodiment 4 of the present invention, and FIGS. 14 and 15 are representations for explaining the operation of this embodiment. As shown in FIG. 13, the vehicular front monitoring apparatus of Embodiment 4 differs from the one of Embodiment 1 in including a first road curvature estimating means 16 for estimating through computation the curvature of a road ahead based on the positions of objects detected by the distance measuring means 1, and a second road curvature estimating means 17 for estimating through computation the curvature of the road based on both outputs of a vehicle speed sensor 11 and a yaw rate sensor 12. The first road curvature estimating means 16 estimates the curvature of the road by performing Hough transform of a position (x, y) of each object detected by the distance measuring means 1 into a line on coordinates in which a horizontal axis indicates the lateral shift amount d from the center line of an own-vehicle and a vertical axis indicates the curvature $\rho$ of the road, using the formula (4) described above in Embodiment 1. The second road curvature estimating means 17 estimates the curvature of the road based on the speed and the yaw rate of the own-vehicle. An output of the second road curvature estimating means 17 is employed to limit an area covered by the first road curvature estimating means 16 for Hough transform.

For performing Hough transform of position data (xi, yi) of detected objects, also in this embodiment, a d-$\rho$ plane is set as a plane which is defined by the lateral shift amount d from the center line of the own-vehicle and the curvature $\rho$ of the road. Then, as shown in FIG. 14, the d-$\rho$ plane is divided into a number Nd of zones in the d-direction and a number N$\rho$ of zones in the $\rho$-direction, i.e., into Nd×N$\rho$ zones of a mesh pattern. Further, a memory array Mpq (p=1 to Nd and q=1 to N$\rho$) is set corresponding to the respective mesh zones. As with Embodiment 1, values of Nd and N$\rho$ are determined from the following formulae:

$$Nd=(d\max-d\min)/\Delta d \tag{21}$$

$$N\rho=(\rho\max-\rho\min)/\Delta\rho \tag{22}$$

Here, dmax and dmin are respectively a maximum and minimum value of the lateral shift amount from the center line of the own-vehicle, $\Delta d$ is a resolution of the lateral shift amount from the center line of the own-vehicle, $\rho$max and $\rho$min are respectively a maximum and minimum value of the curvature of the road, and $\Delta\rho$ is a resolution of the curvature of the road. The maximum and minimum values of the lateral shift amount d are set based on the curvatures and widths of actual roads by referencing to examples of road structure. The maximum and minimum values of the curvature $\rho$ are set based on a maximum change in the curvature of the road per unit time with the curvature of the road determined by the second road curvature estimating means 17 defined at the center. The respective resolutions are decided based on a memory area and a computing speed usable in the estimating step. With such a construction, a practically unlikelihood range of the curvature of the road judging from a time-dependent change rate of the curvature of the road is excluded from a processing range.

Actual processing for estimating the curvature of the road will be described with reference to a PAD shown in FIG. 15. In the processing of this embodiment, computation is carried out as given below using the positional data (xi, yi) of all objects detected at the current time. Here, i=1 to Nbj is assumed and Nbj is the number of objects detected. First, in step 301 of FIG. 5, a value of dp for p of the above-mentioned memory array Mpq is obtained using the following formula (23):

$$dp=d\min+p\cdot\Delta d \tag{23}$$

Subsequently, in step 302, a value of $\rho$tmp is calculated using the following formula (24) from the value of dp and the positional data (xi, yi) of the detected object:

$$\rho tmp=2\cdot(xi-dp)/(xi^2+yi^2-dp^2) \tag{24}$$

In step 303, an array number q corresponding to the calculated value of $\rho$tmp is obtained using the following formula (25):

$$q=(\rho tmp-\rho\min)/\Delta\rho \tag{25}$$

If the value of q obtained using the formula (25) is within the range of 1 to N$\rho$, a value of the corresponding element of the memory array Mpq is incremented in step 304. After the computation is completed for all the detected objects, an array element of Mpq having a maximum value is sought and an array number qm corresponding to that array element is found in step 305. From the array number qm, the curvature ρest of the road is determined in step 306 using the following formula:

$$\rho est = \rho min + qm \cdot \Delta\rho \quad (26)$$

With the vehicular front monitoring apparatus according to Embodiment 4, as described above, since an area for use in Hough transform can be restricted based on the curvature of a road that has been estimated from an output of the yaw rate sensor 12, a necessary memory capacity can be reduced and a quantity of processing to be executed is cut down, thus resulting in a shorter processing time. Additionally, as with Embodiment 2, the yaw rate inputted to the second road curvature estimating means 17 may be determined by providing a steering angle sensor instead of employing the yaw rate sensor 12, and the curvature ρ of the road may be determined using the following formula (27) that includes parameters regarding a steering wheel angle, a vehicle speed and a vehicle itself;

$$\rho = (1 + A \cdot Vs^2) \cdot Lwb / (K \cdot \delta) \quad (27)$$

where Vs is the vehicle's own speed Vs (m/s), K is the coefficient for converting a steering wheel angle into an actual steering angle in units of rad, δ is the steering wheel angle, A is the stability factor of the vehicle, and Lwb is the wheelbase (m) of the vehicle.

Embodiment 5

Figure 16:
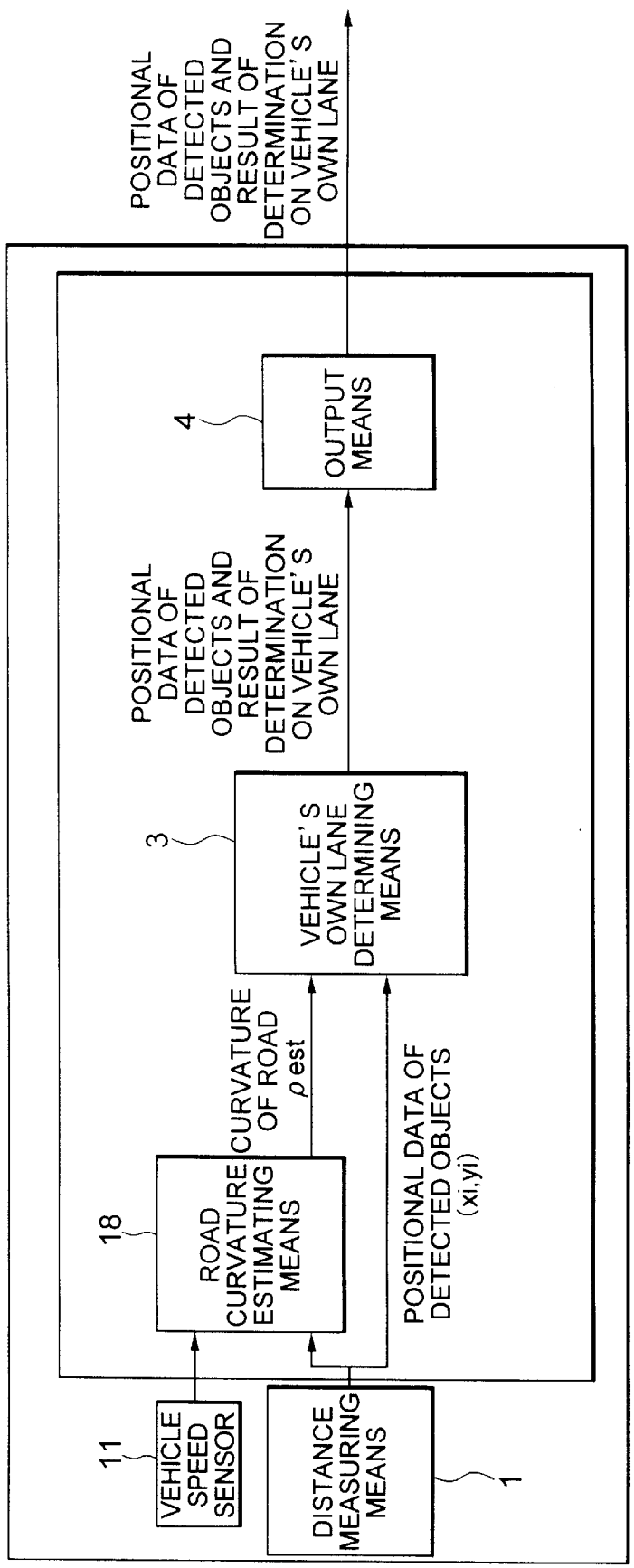
FIG. 16 is a block diagram showing the construction of a vehicular front monitoring apparatus according to Embodiment 5 of the present invention.

FIG. 16 is a block diagram showing the construction of a vehicular front monitoring apparatus according to Embodiment 5 of the present invention, and FIG. 17 is a representation for explaining the operation of this embodiment. This embodiment differs from Embodiment 1 in that a vehicle speed sensor 11 is additionally provided and a road curvature estimating means 18 receives an output of the vehicle speed sensor 11 along with an output of a distance measuring means 1. In this embodiment, the road curvature estimating means 18 performs Hough transform and computes the curvature of a road in accordance with a PAD shown in FIG. 17. On that occasion, a range and resolution of computation are changed depending on a vehicle speed.

The road curvature estimating means 18 estimates the curvature of the road by performing Hough transform of positional data of each object, which is detected by the distance measuring means 1, using the formula (4) described above in Embodiment 1. As shown in FIG. 17, a range of the curvature ρ of the road for use in Hough transform, i.e., a maximum value, a minimum value and a resolution of ρ, are set in step 401. As listed in Table 1 below, for example, when the own-vehicle speed is 80 km/h or more, ρmin=−1/230 (/m), ρmax=1/230 (/m), and Δρ=1/4600 (/m) are set. Further, the number Nρ of divisions of a memory array Mpq is determined by:

$$N\rho = (\rho max - \rho min)/\Delta\rho \quad (28)$$

Incidentally, values listed in Table 1 are based on specified radii of curves in examples of road structure. Also, a maximum value dmax, a minimum value dmin and a resolution Δd of the lateral shift amount d from the center line of the own-vehicle are set in advance as with Embodiment 1.

TABLE 1

| Vehicle's own speed | ρmax | ρmin | Δρ |
|---|---|---|---|
| 120 km/h or more | 1/570 (/m) | −1/570 (/m) | 1/2000 (/m) |
| 100 km/h or more | 1/380 (/m) | −1/380 (/m) | 1/2000 (/m) |
| 80 km/h or more | 1/230 (/m) | −1/230 (/m) | 1/2000 (/m) |
| 60 km/h or more | 1/120 (/m) | −1/120 (/m) | 1/2000 (/m) |
| 50 km/h or more | 1/80 (/m) | −1/80 (/m) | 1/3000 (/m) |
| 40 km/h or more | 1/50 (/m) | −1/50 (/m) | 1/3000 (/m) |
| 30 km/h or more | 1/30 (/m) | −1/30 (/m) | 1/3000 (/m) |
| lower than 30 km/h | 1/15 (/m) | −1/15 (/m) | 1/3000 (/m) |

In step 402, a value of dp for p (p=1 to Nd) is obtained using the following formula (29):

$$dp = dmin + p \cdot \Delta d \quad (29)$$

Subsequently, in step 403, a value of ρtmp is calculated using the following formula (30) from the value of dp and positional data (xi, yi) of a detected object:

$$\rho tmp = 2 \cdot (xi - dp)/(xi^2 + yi^2 - dp^2) \quad (30)$$

In step 404, an array number q corresponding to the calculated value of ρtmp is obtained using the following formula (31):

$$q = (\rho tmp - \rho min)/\Delta\rho \quad (31)$$

If the obtained value of q is within the range of 1 to Nρ, a value of the corresponding element of the memory array Mpq is incremented in step 405. After the computation is completed for all the detected objects, an array element of Mpq having a maximum value is sought and an array number qm corresponding to that array element is found in step 306. Finally, from the array number qm, the curvature ρest of the road is determined in step 407 using the following formula:

$$\rho est = \rho min + qm \cdot \Delta\rho \quad (32)$$

With the vehicular front monitoring apparatus according to Embodiment 5 of the present invention, as described above, since a range and resolution of the curvature ρ of a road for use in Hough transform are increased as the own-vehicle speed lowers, a practically unlikelihood range of the curvature of the road judging from road structures is excluded from processing at high speeds, and a processing time can be cut down. At low speeds, the curvature of the road can be estimated up to a great value with a proper resolution.

According to the vehicular front monitoring apparatus of the present invention, as described above, positions of road structures and other vehicles ahead of an own vehicle are detected by a distance measuring means such as a radar, and a road configuration is computed through Hough transform of array information of the detected objects. It is therefore possible before entering a curved road to estimate the curvature of the road ahead with simple processing, and to improve accuracy in determining whether the other vehicles running ahead are in the same lane as the own-vehicle. Also, since a stationary object is selected based on correspondence between an object detected in the past and an object detected at the current time and Hough transform is performed on an array of the stationary objects, a road configuration can be estimated with high accuracy. Further, since Hough transform is performed using moving objects such as other vehicles when no stationary objects are detected, a road configuration can be estimated regardless of road conditions. In addition, since computation using a vehicle speed and a yaw rate is carried out in a limited range in the step of estimating a road configuration, a necessary storage capacity can be reduced and processing can be sped up. Consequently, a vehicular front monitoring apparatus can be provided which is inexpensive and has superior performance.

What is claimed is:

1. A vehicular front monitoring apparatus, comprising:
    a distance measuring unit which radiates electromagnetic waves in plural directions and detects distances from an own-vehicle to a plurality of objects around the own-vehicle and lateral positions of the objects relative to a running direction of the own-vehicle to measure object positional data (xi, yi) on coordinates defined by the running direction (yi) and a lateral direction (xi) to the running direction;
    a road curvature estimating unit which estimates the curvature of a road ahead of the own-vehicle by setting a plane defined by a lateral shift from a center line of the own-vehicle and the curvature of the road and performing a Hough transform of the measured object positional data, wherein a memory array is defined by dividing the plane into a plurality of zones of a mesh pattern and the curvature of the road is determined by an array element having a maximum occurrence is sought and an array number corresponding to the array element is selected; and
    a lane determining unit which determines whether other vehicles running ahead of said own vehicle are in the same lane as the own-vehicle or not.

2. A vehicular front monitoring apparatus according to claim 1, wherein the lane determining unit determines whether other vehicles running ahead are in the same lane as the own-vehicle or not based on the curvature of the road estimated by said road curvature estimating unit.

3. A vehicular front monitoring apparatus according to claim 2, wherein said road curvature estimating unit performs Hough transform using the following relational formula:

$$(xi-1/\rho)^2+yi^2=(1/\rho-di)^2$$

wherein coordinates of the detected object positional data with an origin point defined as a position of the own-vehicle are (xi, yi), the curvature of the road is $\rho$, and a lateral shift amount of the detected object from a center of the own-vehicle is di.

4. A vehicular front monitoring apparatus according to claim 1, further comprising:
    a speed measuring unit which measures a speed of the own-vehicle;
    a yaw rate measuring unit for measuring a yaw rate of the own-vehicle;
    a detected-object information storing unit which stores past object positional data measured by said distance measuring unit after transforming the past object positional data, based on outputs of said speed measuring unit and said yaw rate measuring unit; and
    a standstill determining unit which determines whether the detected object is stationary or not based on the past object positional data stored in said detected-object information storing unit and a newest object positional data measured by said distance measuring unit,
    wherein the road curvature estimating unit estimates the curvature of a road ahead of the own-vehicle through the Hough transform of the positional data of objects that have been determined to be stationary by said standstill determining unit and wherein the lane determining unit determines whether other vehicles running ahead of the own vehicle are in the same lane as the own-vehicle or not, based on the curvature of the road estimated by said road curvature estimating unit.

5. A vehicular front monitoring apparatus according to claim 4, wherein said road curvature estimating unit performs Hough transform using the following relational formula:

$$(xi-1/\rho)^2+yi^2=(1/\rho-di)^2$$

wherein coordinates of the detected object positional data with an origin point defined as a position of the own-vehicle are (xi, yi), the curvature of the road is $\rho$, and a lateral shift amount of the detected object from a center of the own-vehicle is di.

6. A vehicular front monitoring apparatus according to claim 4, wherein the standstill determining unit determines whether the detected object is stationary by comparing the past object positional data stored in said detected-object information storing unit and the newest object positional data.

7. A vehicular front monitoring apparatus according to claim 6, wherein the past object positional data is stored in said detected-object information storing unit after being transformed into positions on coordinates wherein an origin point is defined as a position of the own-vehicle at a current detection time, based on a distance of movement of the own-vehicle obtained by said own-vehicle speed measuring unit and a change in running direction of the own-vehicle obtained by said yaw rate detecting unit.

8. A vehicular front monitoring apparatus according to claim 4, wherein the past object positional data is stored in said detected-object information storing unit after being transformed into positions on coordinates wherein an origin point is defined as a position of the own-vehicle at a current detection time, based on a distance of movement of the own-vehicle obtained by said own-vehicle speed measuring unit and a change in running direction of the own-vehicle obtained by said yaw rate detecting unit.

9. A vehicular front monitoring apparatus according to claim 4, wherein the yaw rate is measured by a yaw rate sensor mounted on a vehicle.

10. A vehicular front monitoring apparatus according to claim 4, wherein the yaw rate is measured based on outputs of a steering wheel sensor and a vehicle speed sensor.

11. A vehicular front monitoring apparatus according to claim 1, further comprising:
    a speed measuring unit for measuring a speed of the own-vehicle;
    a yaw rate measuring unit for measuring a yaw rate of the own-vehicle;
    a detected-object information storing unit which stores past object positional data measured by said distance measuring unit after transforming the past object positional data, based on outputs of said speed measuring unit and said yaw rate measuring unit;

a standstill determining unit which determines whether the detected object is stationary or not based on the past object positional data stored in said detected-object information storing unit and a newest object positional data measured by said distance measuring unit; and a moving-object information storing unit which stores positional data of objects that have been determined to be not stationary by said standstill determining unit, after the positional data of the objects have been transformed into positions on coordinates wherein an origin point is defined as a position of the own vehicle at a current detection time, based on outputs of said speed measuring unit and said yaw rate measuring unit;

wherein the road curvature estimating unit estimates the curvature of a road ahead of the own-vehicle through the Hough transform of newest positional data of objects that have been determined to be stationary by said standstill determining unit, newest positional data of the objects that have been determined to be not stationary by said standstill determining unit, and the past object positional data stored in said moving-object information storing unit and wherein the vehicle's own lane determining unit determines whether other vehicles running ahead of the own-vehicle are in the same lane as the own-vehicle or not, based on the curvature of the road estimated by said road curvature estimating unit.

12. A vehicular front monitoring apparatus according to claim 11, wherein said road curvature estimating unit performs Hough transform using the following relational formula:

$$(xi-1/\rho)^2 + yi^2 = (1/\rho - di)^2$$

wherein coordinates of the detected object positional data with an origin point defined as a position of the own-vehicle are (xi, yi), the curvature of the road is $\rho$, and a lateral shift amount of the detected object from a center of the own-vehicle is di.

13. A vehicular front monitoring apparatus according to claim 11, wherein the standstill determining unit determines whether the detected object is stationary by comparing the past object positional data stored in said detected-object information storing unit and the newest object positional data.

14. A vehicular front monitoring apparatus according to claim 13, wherein the past object positional data is stored in said detected-object information storing unit after being transformed into positions on coordinates wherein an origin point is defined as a position of the own-vehicle at a current detection time, based on a distance of movement of the own-vehicle obtained by said own-vehicle speed measuring unit and a change in running direction of the own-vehicle obtained by said yaw rate detecting unit.

15. A vehicular front monitoring apparatus according to claim 11, wherein the past object positional data is stored in said detected-object information storing unit after being transformed into positions on coordinates wherein an origin point is defined as a position of the own-vehicle at a current detection time, based on a distance of movement of the own-vehicle obtained by said own-vehicle speed measuring unit and a change in running direction of the own-vehicle obtained by said yaw rate detecting unit.

16. A vehicular front monitoring apparatus according to claim 1, further comprising:

a speed measuring unit for measuring a speed of the own-vehicle;

a yaw rate measuring unit for measuring a yaw rate of the own-vehicle;

a first road curvature estimating unit which estimates the curvature of a road ahead of the own-vehicle through Hough transform of the object positional data measured by said distance measuring unit; and a second road curvature estimating unit which estimates the curvature of a road based on outputs of said speed measuring unit and said yaw rate measuring unit, and changes an estimation range of the curvature of the road of said first road curvature estimating unit, wherein the lane determining unit determines whether other vehicles running ahead of the own-vehicle are in the same lane as the own-vehicle or not, based on the curvature of the road estimated by said first road curvature estimating unit.

17. A vehicular front monitoring apparatus according to claim 16, wherein said road curvature estimating unit performs Hough transform using the following relational formula:

$$(xi-1/\rho)^2 + yi^2 = (1/\rho - di)^2$$

wherein coordinates of the detected object positional data with an origin point defined as a position of the own-vehicle are (xi, yi), the curvature of the road is $\rho$, and a lateral shift amount of the detected object from a center of the own-vehicle is di.

18. A vehicular front monitoring apparatus according to claim 1, further comprising:

a vehicle speed detecting unit for detecting a speed of an own-vehicle, wherein the road curvature estimating unit estimates the curvature of a road ahead of the own-vehicle through Hough transform of the object positional data measured by said distance measuring unit and wherein the lane determining unit determines whether other vehicles running ahead of the own-vehicle are in the same lane as the own-vehicle or not, based on the curvature of the road estimated by said road curvature estimating unit, and wherein an estimation range and estimation accuracy of the curvature of the road estimated by said road curvature estimating unit changes depending on the vehicle speed detected by said speed detecting unit.

19. A vehicular front monitoring apparatus according to claim 18, wherein assuming that coordinates of the detected object positional data with an origin point defined as a position of the own-vehicle are (xi, yi), the curvature of the road is $\rho$, and a lateral shift amount of the detected object from a center of the own-vehicle is di, said road curvature estimating means performs Hough transform using the following relational formula:

$$(xi-1/\rho)^2 + yi^2 = (1/\rho - di)^2.$$

20. A vehicular front monitoring apparatus, comprising:

a distance measuring unit which radiates electromagnetic waves in plural directions and detects distances from an own-vehicle to a plurality of objects around the own-vehicle and lateral positions of the objects relative to a running direction of the own-vehicle to measure object positional data (xi, yi) on coordinates defined by the running direction (yi) and a lateral direction (xi) to the running direction;

a road curvature estimating unit which estimates the curvature of a road ahead of the own-vehicle through a Hough transform of the measured object positional data;

a lane determining unit which determines whether other vehicles running ahead of said own vehicle are in the same lane as the own-vehicle or not;

a speed measuring unit which measures a speed of the own-vehicle;

a yaw rate measuring unit for measuring a yaw rate of the own-vehicle;

a detected-object information storing unit which stores past object positional data measured by said distance measuring unit after transforming the past object positional data, based on outputs of said speed measuring unit and said yaw rate measuring unit; and a standstill determining unit which determines whether the detected object is stationary or not based on the past object positional data stored in said detected-object information storing unit and a newest object positional data measured by said distance measuring unit, wherein the road curvature estimating unit estimates the curvature of a road ahead of the own-vehicle through the Hough transform of the positional data of objects that have been determined to be stationary by said standstill determining unit and wherein the lane determining unit determines whether other vehicles running ahead of the own vehicle are in the same lane as the own-vehicle or not, based on the curvature of the road estimated by said road curvature estimating unit.

21. A method of determining configurations of a road and detecting positions of objects in the vicinity of a vehicle, comprising the steps of:

a) radiating electromagnetic waves in plural directions from said vehicle;

b) collecting the radiated electromagnetic waves and detecting distances from said vehicle to a plurality of objects around said vehicle;

c) determining lateral positions of the objects in the vicinity of the vehicle relative to a running direction of said vehicle to measure object positional data $(x_i, y_i)$ on coordinates defined by the running direction $(y_i)$ and a lateral direction $(x_i)$ to the running direction;

d) estimating a curvature of the road ahead of the own-vehicle through a Hough transform of the measured object positional data in step (c); and e) determining whether other vehicles running ahead of said vehicle are in the same lane as the own-vehicle or not based on the road curvature estimation of step (d).

22. The method according to claim 21, wherein the step of estimating the curvature of the road comprises:

d1) setting a plane (d–$\rho$ plane) defined by a lateral shift amount d from a center line of said vehicle and the curvature $\rho$ of the road, for performing Hough transform of object positional data $(x_i, y_i)$;

d2) dividing the plane into a number $N_d$ of zones in the d-direction and a number $N\rho$ of zones in the $\rho$-direction, thereby defining a mesh pattern;

d3) setting a memory array $M_{p\rho}$ corresponding to the mesh pattern of step (c2);

d4) determining the curvature of the road $\rho$est based on an array element having a maximum value using the following formula:

$$\rho est = \rho min + qm^* \Delta\rho$$

wherein $\rho min$ is a minimum value of the curvature of the road, qm is an array number corresponding to an array number between 1 and $N\rho$ of step (d2), and $\Delta\rho$ is a resolution of the curvature of the road.

* * * * *